(12) United States Patent
Yang et al.

(10) Patent No.: US 8,376,303 B2
(45) Date of Patent: Feb. 19, 2013

(54) SUPPORT FOR ELECTRONIC DEVICE

(75) Inventors: Zhi-Gang Yang, Shenzhen (CN); Hui Yuan, Shenzhen (CN); Ping Yu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 149 days.

(21) Appl. No.: 13/111,929

(22) Filed: May 19, 2011

(65) Prior Publication Data

US 2012/0153114 A1    Jun. 21, 2012

(30) Foreign Application Priority Data

Dec. 21, 2010  (CN) .......................... 2010 1 0602241

(51) Int. Cl.
*A47G 29/00* (2006.01)
(52) U.S. Cl. .................. 248/346.04; 248/146; 248/314; 248/316.1; 361/679.4; 361/679.41
(58) Field of Classification Search ............ 248/346.04, 248/146, 154, 314, 316.1, 316.2, 316.8, 346.03, 248/448, 450; 361/679.4, 679.41, 679.43
See application file for complete search history.

(56) References Cited

U.S. PATENT DOCUMENTS

| | | | | |
|---|---|---|---|---|
| 5,619,397 A | * | 4/1997 | Honda et al. | 361/679.43 |
| 5,774,332 A | * | 6/1998 | Ruch et al. | 361/679.41 |
| 6,042,414 A | * | 3/2000 | Kunert | 439/374 |
| 6,848,662 B2 | * | 2/2005 | Paramonoff et al. | 248/309.1 |
| 7,403,613 B2 | * | 7/2008 | Liou | 379/455 |
| 7,933,117 B2 | * | 4/2011 | Howarth et al. | 361/679.41 |
| 2010/0200721 A1 | * | 8/2010 | Ahn et al. | 248/346.04 |
| 2012/0217367 A1 | * | 8/2012 | Tseng | 248/346.04 |

* cited by examiner

*Primary Examiner* — Anita M King
(74) *Attorney, Agent, or Firm* — Altis Law Group, Inc.

(57) ABSTRACT

A support includes a base, an upper cover connected to the base, a support plate, and a base. The upper cover includes a recess for receiving a bottom of an electronic device, and two openings defined in a bottom of the recess at two opposite ends of the recess for movably receiving pressing members. A pair of pressing members are respectively moveably received in the two openings. Each of the pair of pressing members includes a protruding post rotatably connected to the base. Two elastic members arrange in the base to respectively apply a recoiling, spring force to the pressing members when compressing and releasing. When urged by an electronic device, the pressing members deflect downward to form a first receiving space; and when the electronic device is removed, the pressing members are recoiled by the elastic members and forms a second receiving space.

7 Claims, 6 Drawing Sheets

SUPPORT FOR ELECTRONIC DEVICE

BACKGROUND

1. Technical Field

The present disclosure relates to a support for an electronic device.

2. Description of the Related Art

In certain conditions such as when travelling in car, people may need a support for a mobile phone. It is desirable and useful if a support can support the mobile phone in two different orientations, i.e., a landscape orientation and a portrait orientation.

Therefore, there is room for improvement within the art.

BRIEF DESCRIPTION OF THE DRAWINGS

The components in the drawings are not necessarily drawn to scale, the emphasis instead being placed upon clearly illustrating the principles of a support for an electronic device. Moreover, in the drawings, like reference numerals designate corresponding parts throughout the several views.

DETAILED DESCRIPTION

Figure 1:
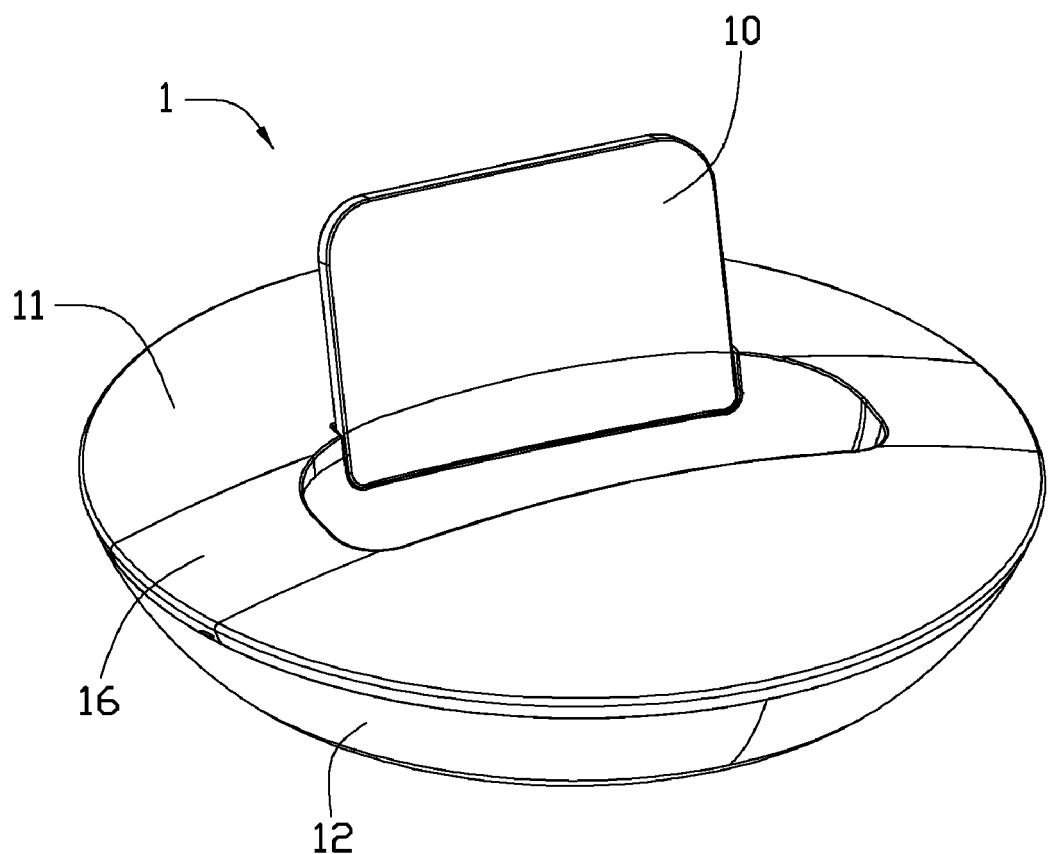
FIG. 1 is an isometric view of a support for an electronic device in accordance with an exemplary embodiment.

Referring to FIG. 1, a support 1 is used for supporting a portable electronic device 2 (shown in FIGS. 4 and 5), such as a mobile phone, a personal digital assistant (PDA), or a music player.

Figure 2:
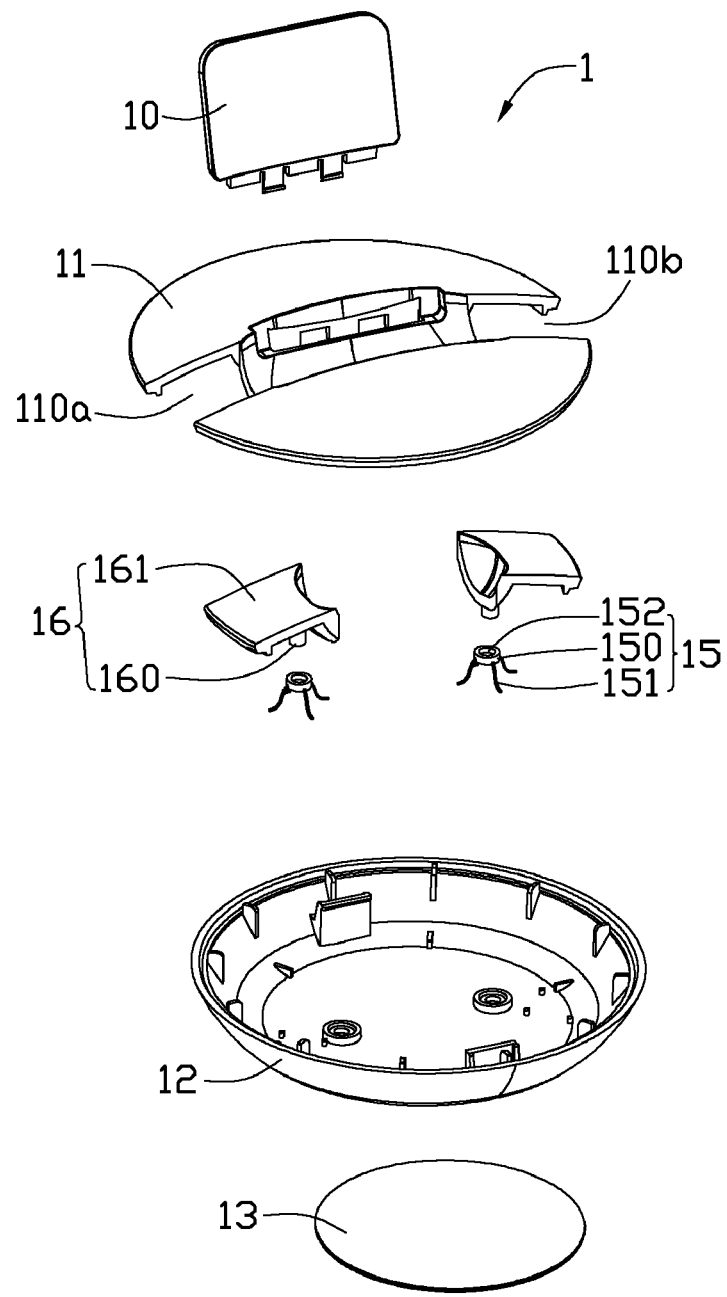
FIG. 2 is an isometric, exploded view of the support in FIG. 1.
Figure 3:
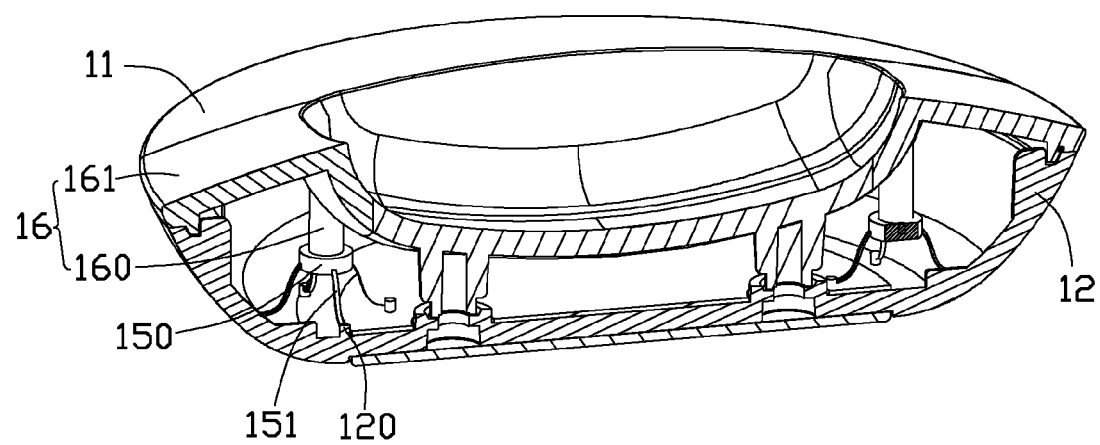
FIG. 3 is a cross-sectional side view of the support in FIG. 1.

Referring to FIGS. 2 and 3, the support 1 includes a support plate 10, an upper cover 11, a base 12, and a bottom cover 13. The support plate 10 protrudes obliquely from the upper cover 11, allowing the portable electronic device 2 to lean. The bottom cover 13 is connected to the base 12.

The support 1 further includes a pair of pressing members 16. The upper cover 11 defines a recess for receiving the bottom of an electronic device 2. Two openings 110a and 110b are defined in the bottom of the recess at two opposite ends of the recess 110. Each of the openings 110a and 110b is used for movably receiving one pressing member 16. Each of the pressing members 16 includes a protruding post 160 rotatably connected to the base 12, and a free end 161. The pressing members 16 can move downward toward the base 12 when depressed.

The support 1 further includes two elastic members 15 arranged in the base 12, and fixed to the pressing members 16. The elastic members 15 are used to apply a recoiling, spring force to the pressing members 16, such that the pressed pressing members 16 can return to their initial positions. In the embodiment, the protruding posts 160 extend from the inner side of the pressing members 16. The protruding posts 160 are configured for fixing the elastic members 15 to the pressing members 16. Each of the elastic members 15 includes a body 150 and at least one elastic arm 151 extending from the body 150. A positioning hole 152 is defined in the body 150 for receiving the free end of the protruding post 160, thereby fixing the elastic member 15 to the pressing member 16. The base 12 includes a number of protrusions 120 correspondingly to the elastic arms 151 of the elastic members 15. The free end of each elastic arm 151 resists against one protrusion 120. In the embodiment, there are three elastic arms 15 and three protrusions 120.

Figure 4:
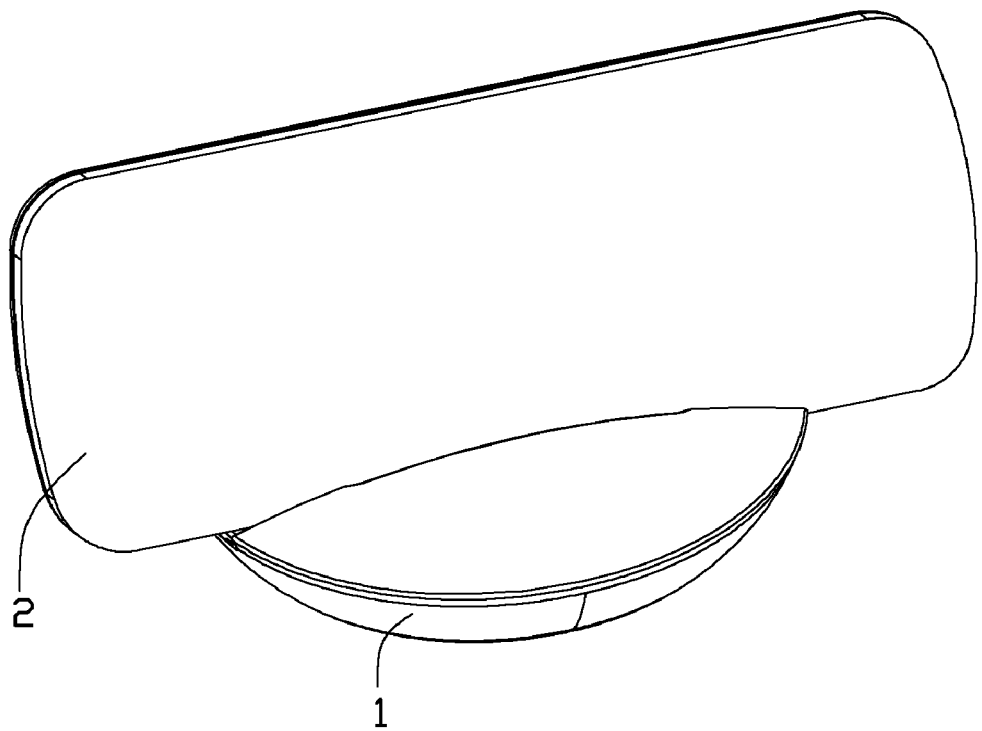
FIG. 4 shows that an electronic device is supported by the support of FIG. 1 in a landscape orientation.
Figure 5:
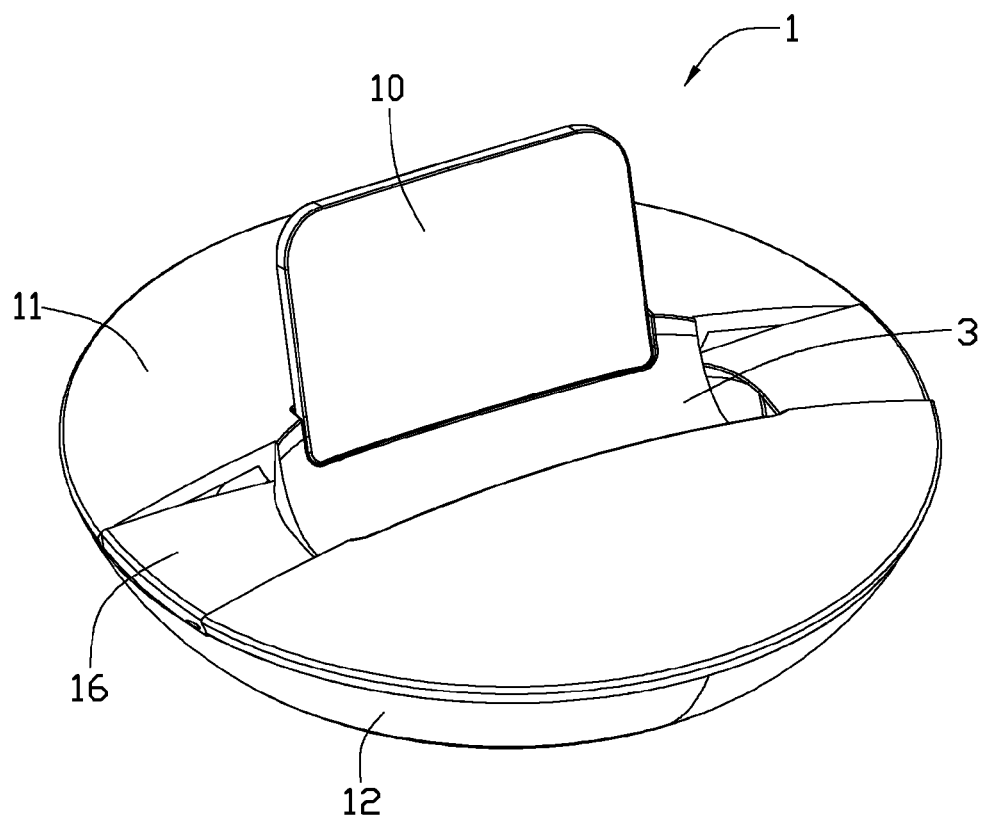
FIG. 5 is similar to FIG. 4, with the electronic device omitted for clarity.

FIGS. 4 and 5 illustrate that the electronic device 2 is supported in a landscape orientation. In such a landscape orientation, the pressing members 16 are urged by the electronic device 2 and are deflected downward, which compress the elastic members 15. Because the pressing members 16 deflect downward, a first receiving space 3 is formed and allows for the placement of the electronic device 2 therein in a landscape orientation. The front and the back of the electronic device 2 respectively resist against the support plate 10 and part of the side wall of the openings 110a and 110b. Thus, the electronic device 2 can be stably retained in the landscape orientation.

Figure 6:
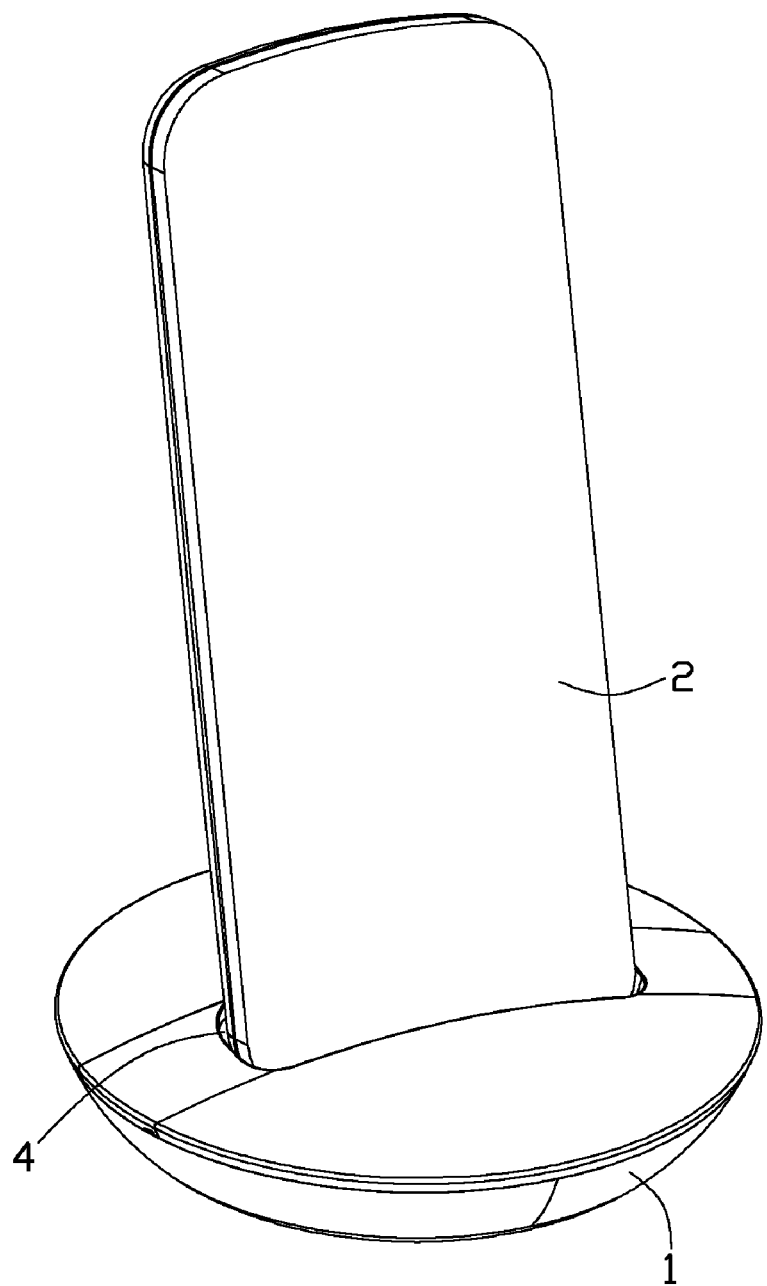
FIG. 6 shows that an electronic device is supported by the support of FIG. 1 in a portrait orientation.

FIG. 6 illustrates that the electronic device 2 is supported in a portrait orientation. Once the electronic device 2 is removed, the pressing members 16 are recoiled by the elastic members 15, which form a second receiving space 4. The second receiving space 4 allows for the placement of the electronic device 2 therein in a portrait orientation. The front and the back of the electronic device 2 respectively resist against the support plate 10 and part of the side wall of the openings 110a and 110b. Thus, the electronic device 2 can be stably retained in the portrait orientation.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A support comprising:
   a base;
   an upper cover connected to the base and comprising:
      a recess, configured for receiving a bottom of an electronic device; and
      two openings defined in a bottom of the recess at two opposite ends of the recess;
   a pair of pressing members respectively and moveably received in the two openings, each of the pair of pressing members comprising a protruding post rotatably connected to the base;
   a support plate protruding obliquely from the upper cover, allowing the electronic device to lean against; and
   two elastic members arranged in the base to respectively apply a recoiling, spring force to the pressing members;
   wherein when urged by the electronic device, the pressing members deflect downward to form a first receiving space; and when the electronic device is removed, the pressing members are rebounded by the elastic members and forms a second receiving space.

2. The support as recited in claim 1, wherein the protruding posts are protruded from the inner side of the pressing members, and configured for fixing the elastic members to the pressing members.

3. The support as recited in claim 1, wherein each of the two elastic members comprising:
   a body; and
   at least one elastic arm protruding from the body.

4. The support as recited in claim 3, wherein a positioning hole is defined in the body of each elastic member and configured for receiving a free end of a corresponding one of the protruding posts to fix the elastic member to the pressing member.

5. The support as recited in claim 3, wherein a plurality of protrusions are formed on the base, corresponding to the elastic arms of the two elastic members, respectively, and a free end of each elastic arm resists against one of the protrusions.

6. The support as recited in claim 5, wherein the number of the at least one elastic arm of each elastic member is three.

7. The support as recited in claim 6, wherein the number of the protrusions corresponding to the three elastic arms of each elastic member is three.

* * * * *